United States Patent
Ikoma et al.

(10) Patent No.: US 12,462,520 B2
(45) Date of Patent: Nov. 4, 2025

(54) OUTSIDE ENVIRONMENT RECOGNITION DEVICE AND OUTSIDE ENVIRONMENT RECOGNITION METHOD

(71) Applicant: Hitachi Astemo, Ltd., Hitachinaka (JP)

(72) Inventors: Hirofumi Ikoma, Hitachinaka (JP); Keiichiro Nagatsuka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 249 days.

(21) Appl. No.: 18/034,000

(22) PCT Filed: Sep. 9, 2021

(86) PCT No.: PCT/JP2021/033185
§ 371 (c)(1),
(2) Date: May 12, 2023

(87) PCT Pub. No.: WO2022/097365
PCT Pub. Date: May 12, 2022

(65) Prior Publication Data
US 2023/0410459 A1    Dec. 21, 2023

(30) Foreign Application Priority Data
Nov. 6, 2020 (JP) .................................. 2020-185870

(51) Int. Cl.
*G06V 20/58* (2022.01)
*G06V 10/22* (2022.01)
(Continued)

(52) U.S. Cl.
CPC ............ *G06V 10/267* (2022.01); *G06V 10/22* (2022.01); *G06V 10/44* (2022.01); *G06V 20/58* (2022.01);
(Continued)

(58) Field of Classification Search
USPC ........................................ 382/103, 104, 106
See application file for complete search history.

(56) References Cited

U.S. PATENT DOCUMENTS

| 2018/0218227 | A1* | 8/2018 | Takaki et al. ............ G06K 9/00 |
| 2020/0264622 | A1 | 8/2020 | Tokumochi |
| 2021/0370931 | A1* | 12/2021 | Sannomiya et al. ........................ B60W 30/095 |

FOREIGN PATENT DOCUMENTS

| JP | 2013-109705 A | 6/2013 |
| JP | 2013-196032 A | 9/2013 |
(Continued)

OTHER PUBLICATIONS

English Translation of International Search Report of International Application No. PCT/JP2021/033185 dated Nov. 30, 2021 (2 pages).

*Primary Examiner* — Twyler L Haskins
(74) *Attorney, Agent, or Firm* — Foley & Lardner LLP

(57) ABSTRACT

There is provided an outside environment recognition device that rapidly performs target recognition processing when there is a possibility that a target coming into contact with an own vehicle appears. There is provided an outside environment recognition device that recognizes a target. An arithmetic operation device includes a blind region edge detection unit that detects an edge of a blind region where the target is likely to appear, based on outside environment information, a traveling path estimation unit that estimates a future path of the own vehicle based on a traveling direction and a speed of the own vehicle included in vehicle information, a recognition region division unit that divides a region between the edge and the path into a first region to which first target recognition processing is applied and a second region to which second target recognition processing is applied, based on a contact possibility between the own vehicle and a virtual target appearing on the path from the (Continued)

edge, and a target detection unit that detects a target appearing from the edge by applying the first target recognition processing in the first region, and detects the target appearing from the edge by applying the second target recognition processing in the second region. The first target recognition processing and the second target recognition processing have different recognition sensitivities.

8 Claims, 7 Drawing Sheets

(51) Int. Cl.
    *G06V 10/26*     (2022.01)
    *G06V 10/44*     (2022.01)
    *G08G 1/16*     (2006.01)

(52) U.S. Cl.
    CPC ......... *G08G 1/166* (2013.01); *G06V 2201/07* (2022.01); *G06V 2201/08* (2022.01)

(56) References Cited

FOREIGN PATENT DOCUMENTS

| JP | 2017-114405 A | 6/2017 |
| JP | 2018-122627 A | 8/2018 |
| JP | 2020-135215 A | 8/2020 |
| WO | WO-2020/166338 A1 | 8/2020 |

* cited by examiner

OUTSIDE ENVIRONMENT RECOGNITION DEVICE AND OUTSIDE ENVIRONMENT RECOGNITION METHOD

TECHNICAL FIELD

The present invention relates to an outside environment recognition device and an outside environment recognition method for detecting a target around an own vehicle during a driving assistance control or an automatic driving control of the vehicle.

BACKGROUND ART

In order to avoid an accident in which an own vehicle during a driving assistance control or an automatic driving control comes into contact with a target (pedestrian, other vehicle, road structure, and the like) around the own vehicle, it is necessary to quickly detect the target by an outside environment recognition device. Therefore, a method for quickly detecting a target even when the target suddenly runs out of a blind region or cuts in has been proposed.

For example, the abstract of PTL 1 discloses the description as follows related to "a vehicle control device capable of properly operating a safety device even when there is an object in a shielded region". "An ECU 10 is applied to a vehicle 50 including object detection sensors 21 and 22, recognizes an object around the own vehicle based on detection results input from the object detection sensors 21 and 22, and performs a collision avoidance control on the object. The ECU 10 includes a determination unit that determines that there is an object in a shielded region near a shielding object when there is the shielding object between the own vehicle 50 and the object, an acquisition unit that acquires a detection situation of the object before the determination when the determination unit determines that there is the object in the shielded region, and a change unit that changes a mode of object recognition when it is determined that there is the object in the shielded region, based on the detection situation of the object acquired by the acquisition unit".

Further, the paragraph 0049 of PTL 1 discloses as follows. "When there is a shielding object between the own vehicle 50 and an object, if a field of view from the own vehicle 50 is obstructed by the shielding object, it is difficult to recognize the object. For example, when there is a pedestrian 70 in a shielded region S near a stopped vehicle 60, it is considered that it is desirable to operate a safety device in consideration of the urgency of object recognition for the pedestrian 70. In this regard, in the above configuration, when it is determined that there is the pedestrian 70 in the shielded region S, the detection situation of the pedestrian 70 before the determination is acquired, and the mode of the object recognition when it is determined that there is the pedestrian 70 in the shielded region S is changed based on the detection situation. Here, for example, it is considered that, when the pedestrian 70 is not detected before it is determined that there is the pedestrian 70 in the shielded region S, the urgency is high, and it is necessary to prioritize the rapidity for the object recognition of the pedestrian 70, and, when the pedestrian 70 is already detected, the urgency is relatively low, and it is necessary to prioritize the reliability for the object recognition of the pedestrian 70".

As described above, according to the vehicle control device in PTL 1, when the stopped vehicle around the own vehicle is detected, an object recognition method is changed in accordance with a previous object detection situation so that the object recognition prioritizing the rapidity can be performed on an object (for example, a pedestrian) that may run out from the shielded region by the stopped vehicle if the object has not been detected, and the object recognition prioritizing the reliability can be performed if the object has been detected.

CITATION LIST

Patent Literature

PTL 1: JP 2018-122627 A

SUMMARY OF INVENTION

Technical Problem

However, the vehicle control device in PTL 1 just sets the object recognition method to either the rapidity prioritized or the reliability prioritized, in accordance with the determination result of the determination unit, and does not consider achievement of both the rapidity and the reliability of the object recognition. Therefore, when the reliability is prioritized, there is a concern that it is not possible to rapidly recognize an object running out of the shielded region, and an object avoidance operation by the driving assistance control and the automatic driving control is not performed in time. In addition, when the rapidity is prioritized, there is a concern that an object is erroneously detected, and the safety device or the like of the driving assistance control or the automatic driving control is unnecessarily operated.

Therefore, the present invention has been made in view of the above problems, and an object of the present invention is to provide an outside environment recognition device capable of achieving both rapidity and reliability of target recognition by dividing a traveling direction of an own vehicle into a plurality of regions and setting an appropriate target recognition method for each region, when a blind region is detected.

Solution to Problem

In order to solve the above problems, according to the present invention, an outside environment recognition device includes an information acquisition device that acquires outside environment information from an outside environment sensor and vehicle information from a vehicle sensor, and an arithmetic operation device that recognizes a target based on the outside environment information and the vehicle information. The arithmetic operation device includes a blind region edge detection unit that detects an edge of a blind region where the target is likely to appear, based on the outside environment information, a traveling path estimation unit that estimates a future path of an own vehicle based on a traveling direction and a speed of the own vehicle included in the vehicle information, a recognition region division unit that divides a region between the edge and the path into a first region to which first target recognition processing is applied and a second region to which second target recognition processing is applied, based on a contact possibility between the own vehicle and a virtual target appearing in the path from the edge, and a target detection unit that applies the first target recognition processing to detect a target appearing from the edge in the first region, and applies the second target recognition processing to detect a target appearing from the edge in the second region. The first target recognition processing and the second target recognition processing have different recognition sensitivities.

Advantageous Effects of Invention

According to the outside environment recognition device in the present invention, it is possible to achieve both rapidity and reliability of target recognition by dividing a traveling direction of an own vehicle into a plurality of regions and setting an appropriate target recognition method for each region, when a blind region is detected. As a result, it is possible to rapidly recognize a target running out from the blind region and perform an appropriate avoidance action and the like, and to avoid performing of an unnecessary driving assistance control and an unnecessary automatic driving control due to erroneous detection of the target.

DESCRIPTION OF EMBODIMENTS

Hereinafter, an outside environment recognition device 100 according to embodiments of the present invention will be described with reference to the drawings.

Embodiment 1

Figure 1:
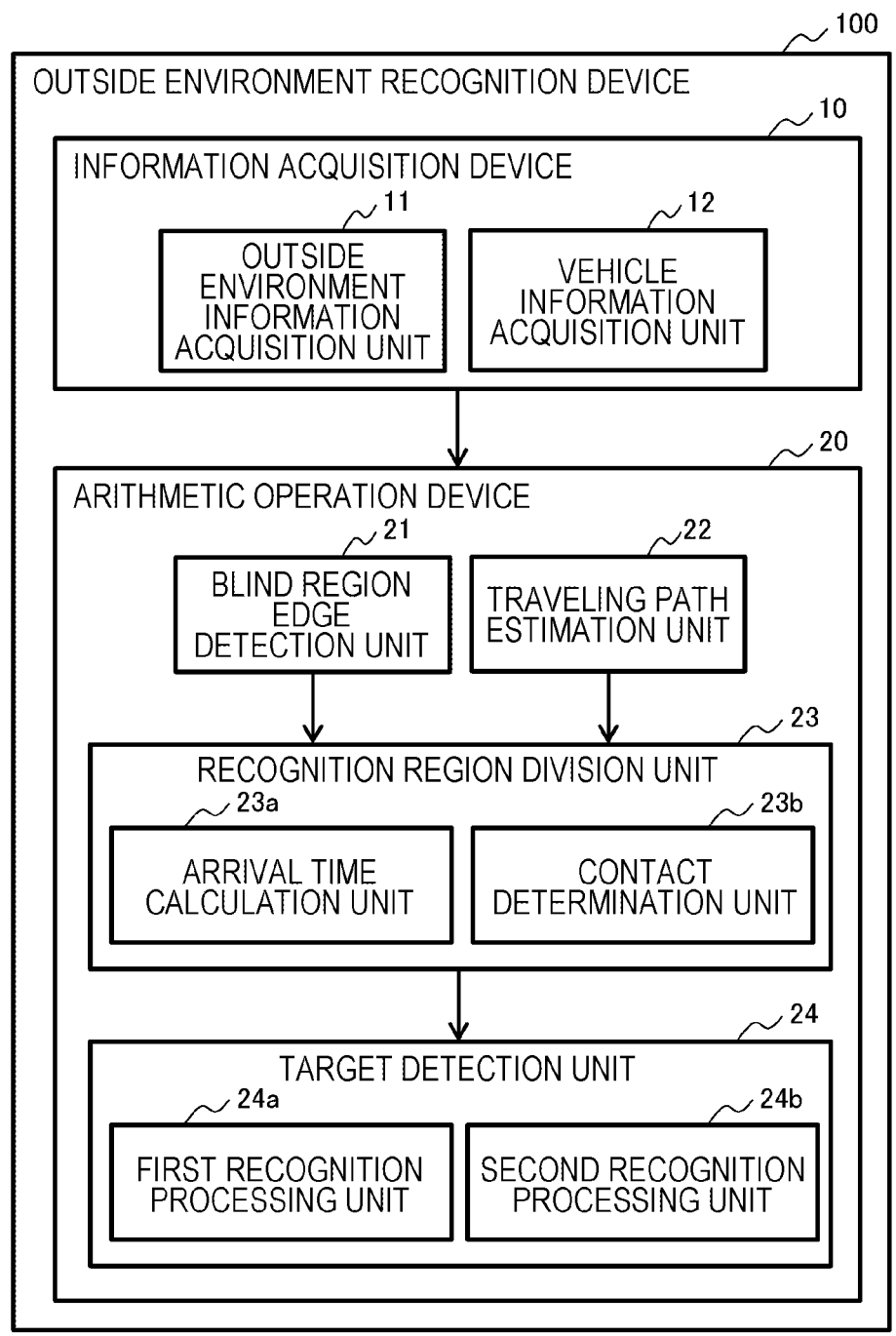
FIG. 1 is an overall configuration diagram of an outside environment recognition device according to Embodiment 1.

FIG. 1 illustrates an example of an overall configuration of the outside environment recognition device 100 according to Embodiment 1 of the present invention. The outside environment recognition device 100 illustrated here is a device that recognizes outside environment information including target information necessary when the own vehicle 1 performs an automatic driving control and a driving assistance control. The outside environment recognition device 100 includes an information acquisition device 10 and an arithmetic operation device 20. Note that, the target information in the present embodiment is originally information related to a moving object such as a pedestrian, a bicycle, or other vehicle around the own vehicle 1. In the present embodiment, for the simplicity of the description, the present invention will be described by using, as an example, target information in an environment where there is only a vehicle and a pedestrian or a bicycle does not exist, unless otherwise specified.

(Information Acquisition Device 10)

The information acquisition device 10 is a device that acquires outside environment information around the own vehicle 1 and vehicle information of the own vehicle 1. The information acquisition device 10 includes an outside environment information acquisition unit 11 and a vehicle information acquisition unit 12.

The outside environment information acquisition unit 11 acquires outside environment information such as the relative position and the relative speed between the target and the own vehicle 1, the type of the target, and the like, based on the output of an outside environment sensor such as a radar sensor using a millimeter wave, a laser, or the like or a camera sensor using an imaging element, which are mounted on the own vehicle 1. The outside environment information acquisition unit 11 outputs the outside environment information to the arithmetic operation device 20.

The vehicle information acquisition unit 12 acquires vehicle information such as a traveling speed and a steering wheel angle of the own vehicle 1, based on an output of a vehicle sensor such as a speed sensor and a steering angle sensor, which are mounted on the own vehicle 1. The vehicle information acquisition unit 12 outputs the vehicle information to the arithmetic operation device 20.

(Arithmetic Operation Device 20)

The arithmetic operation device 20 is a device that detects a target based on the outside environment information and the vehicle information obtained from the information acquisition device 10. The arithmetic operation device 20 includes a blind region edge detection unit 21, a traveling path estimation unit 22, a recognition region division unit 23, and a target detection unit 24. The recognition region division unit 23 includes an arrival time calculation unit 23a and a contact determination unit 23b. The target detection unit 24 includes a first recognition processing unit 24a and a second recognition processing unit 24b. Note that, specifically, the arithmetic operation device 20 is a device mounted on an electronic control unit (ECU) including a CPU and a memory (ROM, RAM), and is a device that realizes the functions of the blind region edge detection unit 21 and the like by the CPU executing various processing programs stored in the memory.

In the arithmetic operation device 20, the blind region edge detection unit 21 detects an edge E of a blind region D, and the traveling path estimation unit 22 estimates a future path R of the own vehicle 1. The recognition region division unit 23 divides a region around the path R into a first region $A_1$ and a second region $A_2$ based on the degree of a contact possibility between the own vehicle 1 and a virtual target running out on the path R from the edge E of the blind region D. First target recognition processing with a high recognition sensitivity and priority on rapidity is applied to the first region $A_1$. Second target recognition processing with a low recognition sensitivity and priority on reliability is applied to the second region $A_2$. The target detection unit 24 detects a target appearing from the blind region D based on the outside environment information by using the recognition processing set in each region.

Figure 2:
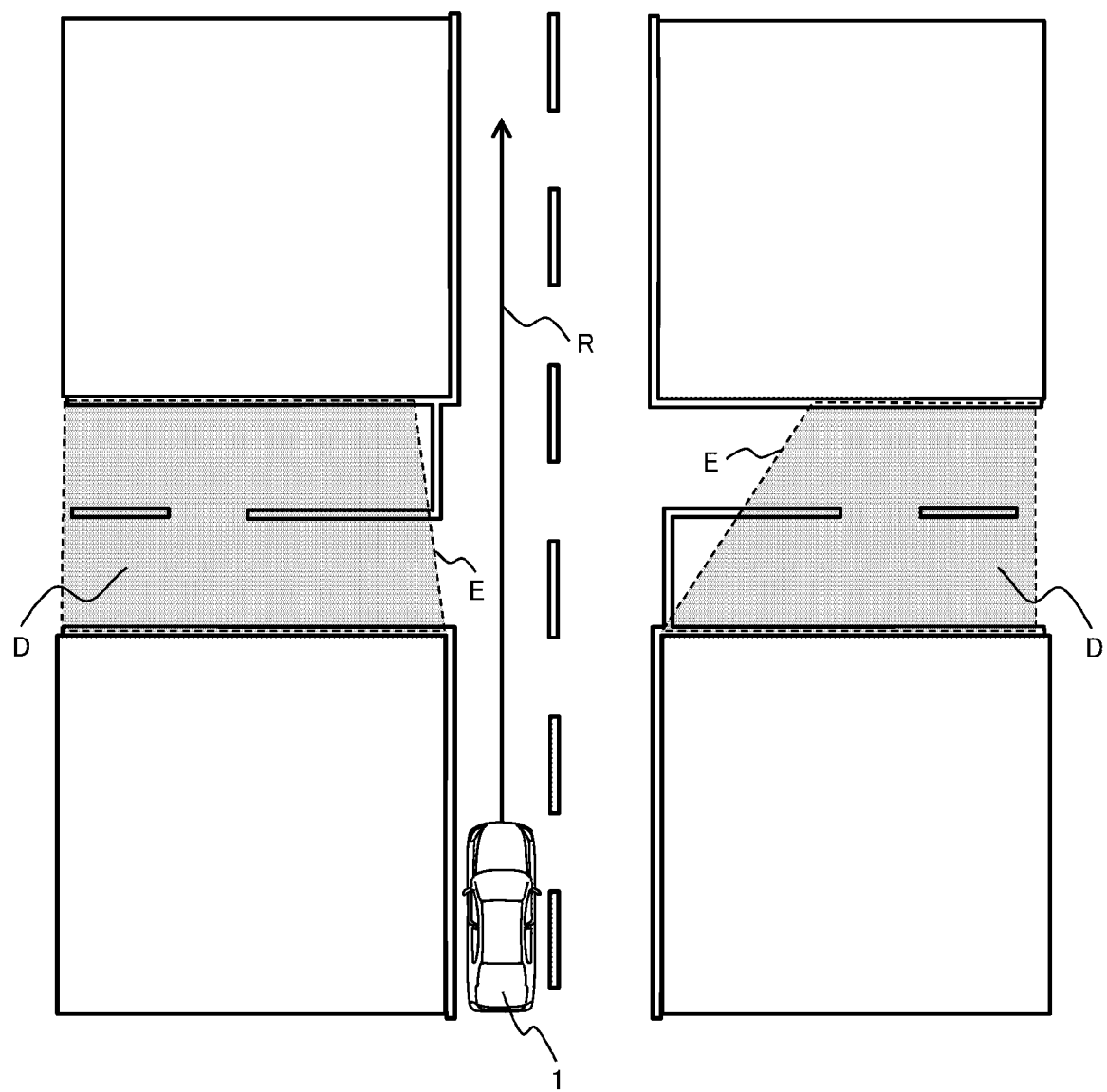
FIG. 2 is a plan view for explaining a situation where an own vehicle enters into an intersection having a blind spot.

Here, a scene in which the own vehicle 1 enters into an intersection having a blind spot, as illustrated in FIG. 2, is considered as a representative environment in which the present invention is effective. When the own vehicle 1 passes through a poor-visible intersection such as a residential area, a field of view from the own vehicle 1 is blocked by a building, and a blind region D is generated. Even when a target (other vehicle 2) runs out of the blind region D onto the path R of the own vehicle 1 under such a situation, the own vehicle 1 during a driving assistance control or an automatic driving control needs to rapidly detect the target (other vehicle 2) and perform an appropriate avoidance action such as braking or steering.

In a vehicle control device in the related art, when the method of uniformly relaxing the criterion of target recognition in order to rapidly detect a target (another vehicle 2) running out of a blind region D when the blind region D is detected in the environment of FIG. 2 is adopted. However, when the criterion of target recognition is uniformly relaxed, and the rapidity of target recognition is prioritized, there are problems that the reliability of target detection is uniformly impaired, and, for example, erroneous detection occurs for a distant target or the like that originally does not require rapid target detection, and an unnecessary operation of a safety device or the like of the driving assistance control or the automatic driving control increases.

Therefore, in the arithmetic operation device 20 in the present embodiment, when the blind region edge detection unit 21 detects the edge E of the blind region D, and the recognition region division unit 23 determines the degree of the possibility that the virtual target running out of the edge E comes into contact with the own vehicle 1. A region (for example, a region immediately in front of the own vehicle 1) determined to have a relatively high contact possibility is set to the first region $A_1$, and a first target recognition method capable of rapidly recognizing the target is applied in the first region $A_1$. On the other hand, a region (for example, a distant region or a region outside the path R of the own vehicle 1) determined to have a relatively low contact possibility is set as the second region $A_2$, and a second target recognition method capable of reliably recognizing the target is applied in the second region $A_2$. Thus, even when the target suddenly runs out or cuts in from the edge E of the blind region D, if such an event occurs in the first region $A_1$, it is possible to increase the detection speed of the target. If the event occurs in the second region $A_2$, it is possible to improve the detection accuracy of the target. As a result, unlike the conventional control described above, it is possible to achieve both rapid target detection in the first region $A_1$ having a high contact possibility and suppression of an occurrence of erroneous detection of a target in the second region $A_2$ having a low contact possibility. Details of each unit in the arithmetic operation device 20 outlined above will be sequentially described.

<Blind Region Edge Detection Unit 21>

The blind region edge detection unit 21 detects the edge E of the blind region D generated from the positional relationship between the target and the own vehicle 1 based on the outside environment information acquired from the outside environment information acquisition unit 11. For example, when the outside environment information acquisition unit 11 uses a radar sensor, a method of detecting the target by receiving the reflected wave of an electromagnetic wave emitted within an irradiation angle, and detecting the edge E of the blind region D based on a point group of the reflected wave received at this time or the like is conceivable. Furthermore, when the outside environment information acquisition unit 11 uses a camera sensor, a method of detecting an obstacle that generates the blind region D based on images captured in time series, and accumulating position information and movement speed information of the obstacle to detect the edge E of the blind region D, and the like is conceivable.

<Traveling Path Estimation Unit 22>

The traveling path estimation unit 22 estimates a future path R of the own vehicle 1 based on the vehicle information (traveling direction, vehicle speed, steering angle, and the like) of the own vehicle 1, which is acquired from the outside environment information acquisition unit 11. For example, it is the simplest configuration to calculate the path R on the assumption that the own vehicle 1 performs a uniform circular movement from the current vehicle speed and the current steering angle. In addition, performing a speed plan and a route plan of the own vehicle 1 based on the environment around the own vehicle acquired from the outside environment sensor is a configuration for improving the estimation accuracy of the path R. Further, in order to improve the accuracy, map information may be used together in this configuration.

<Recognition Region Division Unit 23>

The recognition region division unit 23 includes the arrival time calculation unit 23a and the contact determination unit 23b.

The arrival time calculation unit 23a calculates a time when the virtual target arrives on the path R in a case where the virtual target runs out of the edge E on the path R, based on the edge E of the blind region D and the path R obtained from the blind region edge detection unit 21 and the traveling path estimation unit 22. In the present embodiment, the arrival time calculation unit 23a performs the calculation on the assumption that the virtual target is the another vehicle 2, the movement speed is 15 km/h, and the total length is 5 m.

Figure 3:
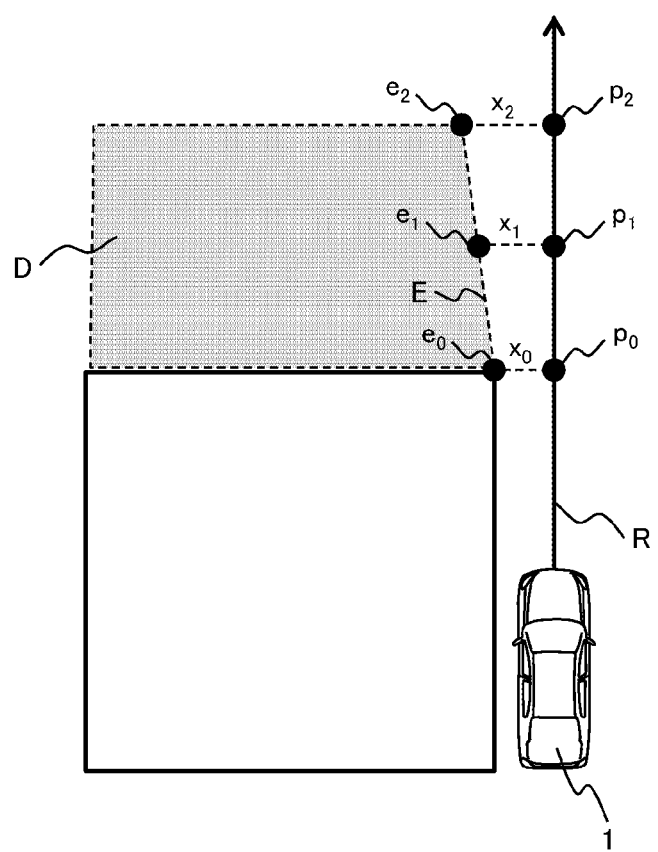
FIG. 3 is a diagram for explaining edge division of a blind region according to Embodiment 1 at the intersection in FIG. 2.

First, the arrival time calculation unit 23a divides the detected edge E of the blind region D at certain intervals. Regarding the width for division, it is sufficient to perform division by using the entire width of the own vehicle 1 or the like as an index. Specifically, as illustrated in FIG. 3 focusing on the blind region D on the left side in FIG. 2, a plurality of division points $e_n$ are generated on the edge E of the detected blind region D. Regarding the division points $e_n$, the division point e n with a certain width is generated by using, as a start point $e_0$, an edge portion of an obstacle that generates the blind region D. In the example of FIG. 3, three division points $e_0$ to $e_2$ are generated. Note that, in implementing the present invention, there is no upper limit on the number of divisions of the edge E, and as the number of divisions is increased, highly accurate control can be performed. However, if the number of divisions is increased, the arithmetic operation load increases. Therefore, the number of divisions may be determined in consideration of the arithmetic operation capability of the ECU.

Then, the arrival time calculation unit 23a calculates the time when the target arrives on the path R, on the assumption that the target runs out of each division point. Similarly, the time when the own vehicle 1 arrives at the arrival point of the target is also calculated. Specifically, as illustrated in FIG. 3, if a point at which the virtual target arrives on the path R is set as the arrival point $p_n$ on the assumption that the target runs out of the generated division point $e_n$ toward the path R, arrival points $p_0$ to $p_2$ can be generated for the division points $e_0$ to $e_2$. At this time, a direction in which the target runs out is perpendicular to the path R, but may be a direction along a road shape. A line $x_n$ connecting the division point $e_n$ and the arrival point $p_n$ functions as a distance at which the virtual target running out arrives at the path R. The time $t_n$ when the virtual target arrives at the path R is calculated by dividing the arrival distances $x_0$ to $x_2$ of the virtual target by the speed v (for example, 15 km/h) of the virtual target. The time $T_n$ when the own vehicle 1 arrives at the arrival point $p_n$ can be calculated from the coordinates of the path R.

For each of the arrival points $p_n$, the contact determination unit 23b determines the degree of the possibility that the virtual target running out comes into contact with the own vehicle 1, and sets each of the plurality of division regions as the first region $A_1$ and the second region $A_2$ based on the determination result. Specifically, in the contact determination between the virtual target and the own vehicle 1, the determination is made by comparing the time $t_n$ when the virtual target arrives at the arrival point $p_n$ with the time $T_n$ when the own vehicle 1 arrives at the arrival point $p_n$. In order to determine the degree of the possibility that the virtual target comes into contact with the front end of the own vehicle, it is necessary to consider the entire width of the own vehicle 1 and the entire length of the another vehicle 2. When the another vehicle 2, which is a virtual target, runs out of the blind region D on the left side from the own vehicle 1, an arrival time $t_{n-a}$ until the front end of the another vehicle 2 arrives at the left front end of the own vehicle 1 from the division point $e_n$, and an arrival time $t_{n+a}$ until the rear end of the another vehicle 2 arrives at the right front end of the own vehicle 1 from the division point $e_n$ are calculated. Then, as shown in Expression 1, when the arrival time $T_n$ of the own vehicle 1 falls within a range from the arrival time $t_{n-a}$ to the arrival time $t_{n+a}$, it is determined that the contact possibility between the own vehicle 1 and the virtual target (other vehicle 2) running out of the division point $e_n$ is high.

$$t_{n-a} \leq T_n \leq t_{n+a} \quad \text{(Expression 1)}$$

When the contact determination unit 23b determines that the contact possibility is high, from the determination result of the contact possibility between the virtual target (other vehicle 2) and the own vehicle 1, the contact determination unit 23b sets the region as the first region $A_1$ to which the first target recognition processing is applied. When the contact determination unit 23b determines that the contact possibility is low, the contact determination unit sets the region as the second region $A_2$ to which the second target recognition processing is applied. As described above, by dividing the edge E of the blind region D and determining the degree of the contact possibility between the own vehicle 1 and the target (another company 2) running out in each division region, it is possible to divide the edge E of the blind region into the first region $A_1$ to be noted and the second region $A_2$ not to be noted, and the target detection unit 24 described later applies target recognition processing with appropriate recognition sensitivity.

Figure 4:
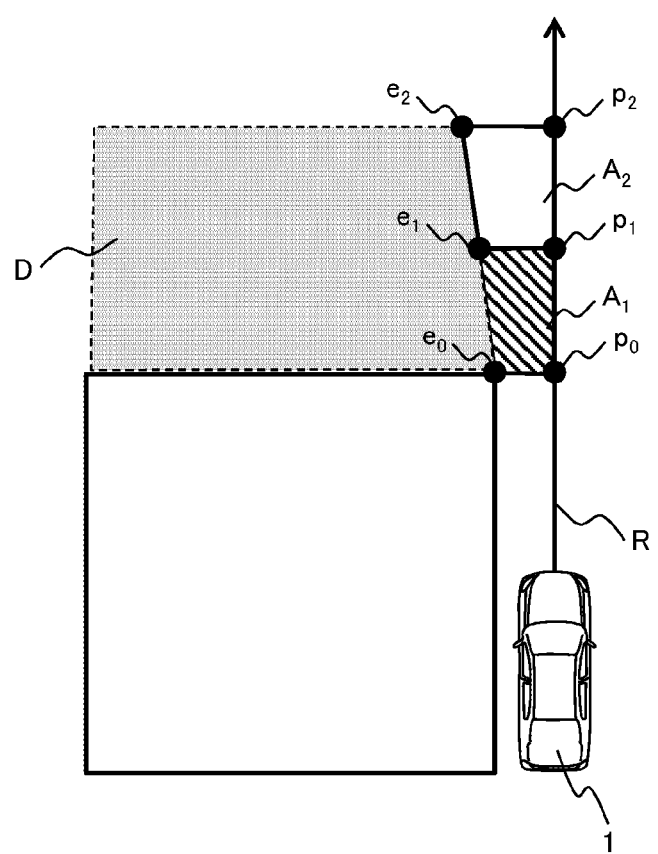
FIG. 4 is a diagram for explaining recognition region division according to Embodiment 1 at the intersection in FIG. 2.

FIG. 4 is a setting example of the first region $A_1$ and the second region $A_2$ by the recognition region division unit 23 under the environment of FIG. 3. As shown here, when the contact possibility is determined to be high at the arrival point $p_0$ and the contact possibility is determined to be low at $p_1$, the region on the front side surrounded by $e_0$, $p_0$, $p_1$, and $e_1$ is set as the first region $A_1$ to which the first target recognition processing with a high recognition sensitivity and priority on rapidity is applied, and the region on the back side surrounded by $e_1$, $p_1$, $p_2$, and $e_2$ is set as the second region $A_2$ to which the second target recognition processing with a low recognition sensitivity and priority on reliability is applied.

<Target Detection Unit 24>

The target detection unit 24 determines a region for which the outside environment information acquired from the outside environment information acquisition unit 11 has been detected, and recognizes the target based on the recognition processing set in each region by the recognition region division unit 23. Therefore, the target detection unit 24 includes the first recognition processing unit 24a and the second recognition processing unit 24b.

Target recognition processing of the first recognition processing unit 24a and target recognition processing of the second recognition processing unit 24b have different recognition sensitivities. The recognition sensitivity varies depending on the target recognition processing, and corresponds to a criterion for determining that the existence of the target is reliable. For example, in the target recognition processing, the outside environment information from the outside environment sensor is acquired in time series, it is determined that the existence of the target is reliable when the target is continuously detected a plurality of times, and the existence of the target is recognized at this position.

The number of a plurality of continuous times of detection becomes a threshold value, and a first threshold value for the first recognition processing unit 24a is set to be smaller than a second threshold value for the second recognition processing unit 24b. Therefore, the first recognition processing unit 24a is target recognition processing that has a processing time of target recognition shorter than the second recognition processing unit 24b and priority on rapidity and is applied in emergency. On the other hand, the threshold value of the second recognition processing unit 24b is set to be greater than the threshold value of the first recognition processing unit 24a. Therefore, the second recognition processing unit 24b is target recognition processing that has a processing time of target recognition longer than the first recognition processing unit 24a and priority on reliability, and is applied when no emergency is required.

As described above, the target detection unit 24 determines the region in which the target acquired from the outside environment sensor is detected, and recognizes the target by using the first recognition processing unit 24a or the second recognition processing unit 24b based on the recognition processing determined by the recognition region division unit 23.

(Flowchart of Processing of Arithmetic Operation Device 20)

Figure 5:
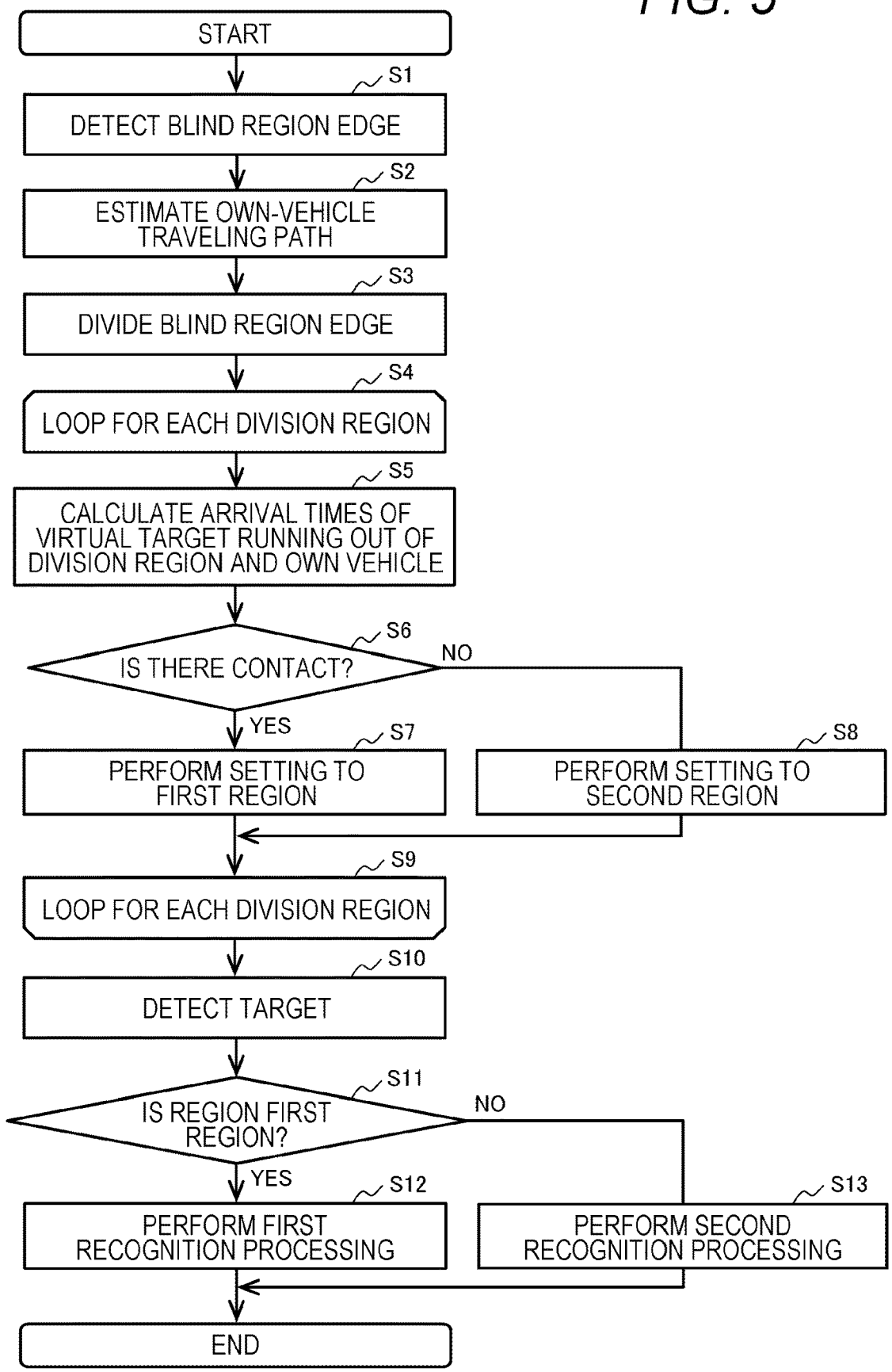
FIG. 5 is a flowchart illustrating a processing operation of the recognition region division according to Embodiment 1.

Here, the procedure of recognition region division processing performed by the arithmetic operation device 20 and the subsequent target detection processing will be described with reference to the flowchart of FIG. 5. Note that the processing of FIG. 5 is repeatedly performed in the arithmetic operation device 20 at a predetermined period.

First, in Steps S1 and S2, the blind region edge detection unit 21 and the traveling path estimation unit 22 detect an edge E of a blind region D and estimate a path R of the own vehicle 1.

In Step S3, the recognition region division unit 23 divides the detected edge E at a certain interval.

Between Step S4 and Step S9, the recognition region division unit 23 performs loop processing by the number of divisions in Step S3, and performs processing focusing on each division point $e_n$.

First, in Step S5, the arrival time calculation unit 23a calculates a time $t_n$ when a virtual target arrives on the path R of the own vehicle 1 from each division point $e_n$, and a time $T_n$ when the own vehicle 1 arrives at the arrival point p n of the target.

In Step S6, the contact determination unit 23b compares the arrival time $t_n$ of the virtual target and the arrival time $T_n$ of the own vehicle 1, which are calculated by the arrival time calculation unit 23a, to each other, and determines the degree of the contact possibility between the own vehicle 1 and the virtual target running out of the focusing division point $e_n$. When it is determined that the contact possibility is high, the process proceeds to Step S7. When it is determined that the contact possibility is low, the process proceeds to Step S8. Note that the concept described in detail in Expression 1 is applied to the determination here.

In Step S7, since it is determined that the contact possibility between the virtual target and the own vehicle 1 is high, the recognition region division unit 23 sets the focusing division region as the first region $A_1$.

In Step S8, since it is determined that the contact possibility between the virtual target and the own vehicle 1 is low, the recognition region division unit 23 sets the focusing division region as the second region $A_2$.

In Step S10, the target detection unit 24 acquires outside environment information detected by the outside environment information acquisition unit 11.

In Step S11, it is determined whether the detected target information is detected in the first region $A_1$. When it is determined that the detection has been made in the first region $A_1$, the process proceeds to Step S12. When it is determined that the detection has been made in the second region $A_2$, the process proceeds to Step S13.

In Step S12, the first recognition processing unit 24a recognizes the target by applying the first target recognition processing with priority on the rapidity to the target information detected in the first region $A_1$.

In Step S13, the second recognition processing unit 24b recognizes the target by applying the second target recognition processing with priority on the reliability to the target information detected in the second region $A_2$.

By the outside environment recognition device 100 in the present embodiment as described above, regarding a blind region D generating a place with poor visibility as in FIG. 2 during traveling, the edge E of the blind region D having a possibility that a target appears is detected, the edge E of the blind region D is divided, whether a virtual target running out of each divided region comes into contact with the own vehicle 1 is determined, the division region determined to have a high contact possibility is set as the first region $A_1$ to which the first target recognition processing is applied, and the division region determined to have a low contact possibility is set as the second region $A_2$ to which the second target recognition processing is applied. When the target is detected in the first region $A_1$ by the outside environment information acquisition unit 11, the first target recognition processing is performed. In this manner, it is possible to rapidly detect the target. Furthermore, when the target is detected in the second region $A_2$, the second target recognition processing is performed, so that it is possible to accurately detect the target. Even when sudden running out or interruption occurs in a place with poor visibility, it is possible to increase the detection speed.

As described above, according to the outside environment recognition device in the present embodiment, it is possible to achieve both rapidity and reliability of target recognition by dividing a traveling direction of an own vehicle into a plurality of regions and setting an appropriate target recognition method for each region, when a blind region is detected. As a result, it is possible to rapidly recognize a target running out of the blind region and perform an appropriate avoidance action and the like, and to avoid performing of an unnecessary driving assistance control and an unnecessary automatic driving control due to erroneous detection of the target.

MODIFICATION EXAMPLES

In Embodiment 1, the scene of passing through the intersection as illustrated in FIG. 2 has been described as the representative scene in which the present invention is effective, but the present invention is also effective in other scenes.

Figure 6:
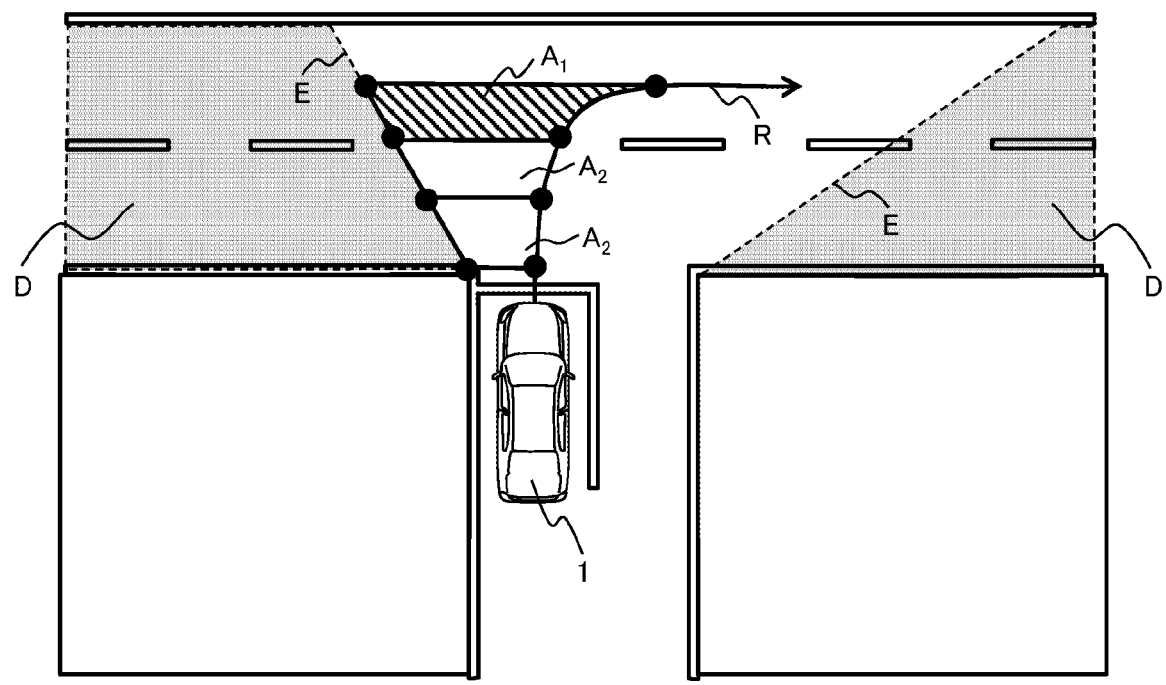
FIG. 6 is a diagram for explaining the recognition region division in Embodiment 1 using T-junction right turn as an example.

For example, the present invention is also effective in a scene of turning right on a T-junction as illustrated in FIG. 6. This scene shows a situation in which the own vehicle 1 temporarily stopped on the non-priority road side is about to enter into the priority road having one lane on each side. Left and right blind regions D are generated by the left and right buildings of the own vehicle 1. In this case, by the processing illustrated in the flowchart of FIG. on the left side of the path R of the own vehicle 1 about to turn right, the second region $A_2$ is set in the front lane, and the first region $A_1$ is set in the back lane. Note that, under such an environment, the recognition region division unit 23 sets the first region $A_1$ and the second region $A_2$ by using Expression 1 described above, on the assumption that the another vehicle 2 is traveling on the priority road at a legal speed (for example, 40 km/h).

Figure 7:
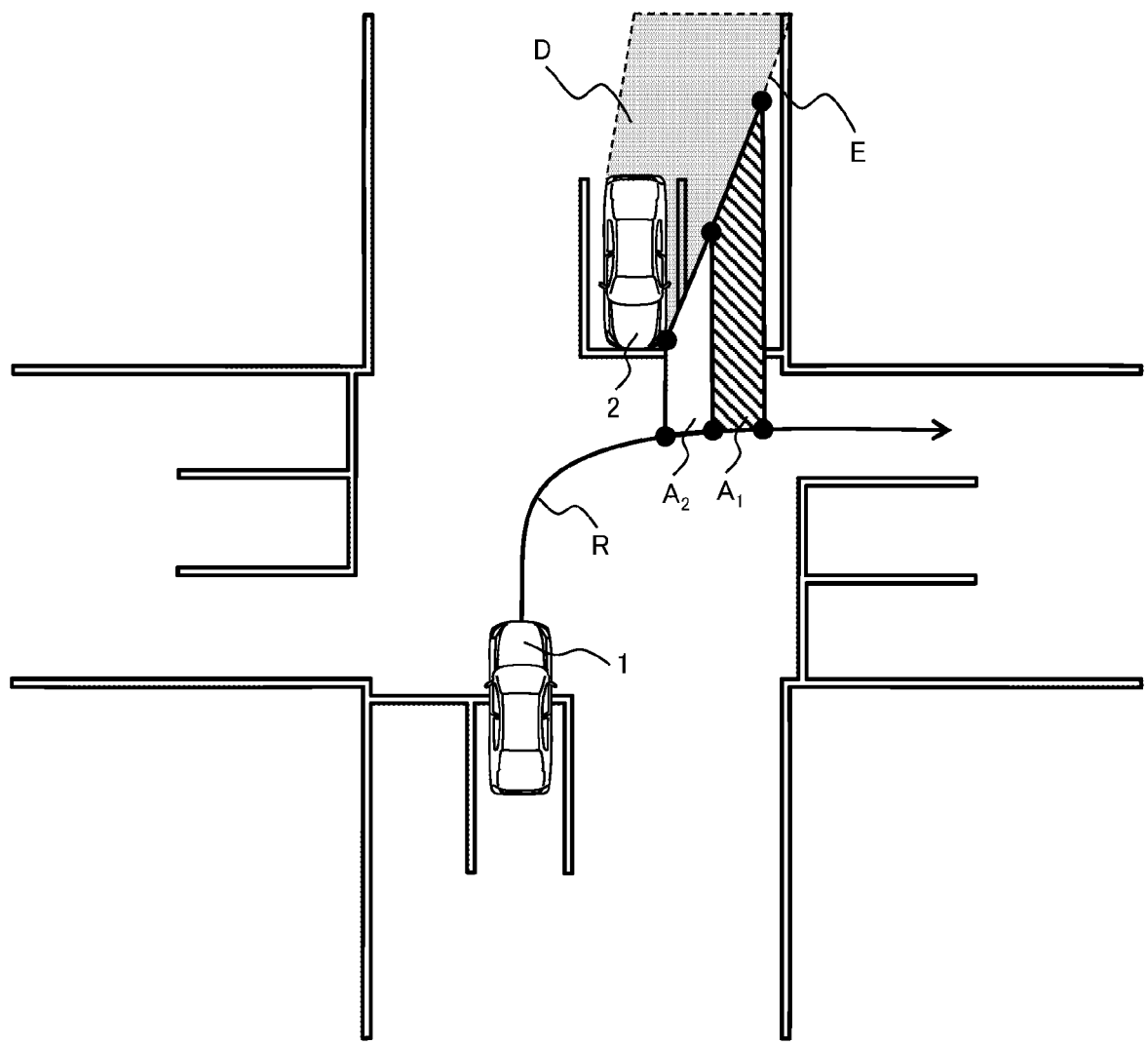
FIG. 7 is a diagram for explaining the recognition region division in Embodiment 1 using an intersection right turn as an example.

In addition, even in an intersection with good visibility as illustrated in FIG. 7, the present invention is effective even in a scene where the blind region D is generated by the another vehicle 2 that is about to turn right. This scene shows a situation in which the own vehicle 1 temporarily stopped in the right turn lane is about to turn right, and the blind region D is generated in the straight/left turn lane of the opposite lane by the another vehicle 2 in the opposite lane. In this case, by the processing illustrated in the flowchart of FIG. 5, on the left side of the path R of the own vehicle 1 and on the straight/left turn lane of the opposite lane, the second region $A_2$ is set on the another vehicle 2 side, and the first region $A_1$ is set in the other portion. Note that, even under such an environment, the recognition region division unit 23 sets the first region $A_1$ and the second region $A_2$ by using Expression 1 described above, on the assumption that another vehicle other than the another vehicle 2 illustrated is traveling on the straight/left turn lane at a legal speed (for example, 60 km/h).

Furthermore, the present invention can be applied not only to the intersection as illustrated in FIGS. 2, 6, and 7, but also to a scene where the blind region D is generated at a place other than the intersection, such as a place at the time of merging on an expressway or moving in a parking lot. Needless to say, the recognition region division unit 23 sets the first region $A_1$ and the second region $A_2$ on the assumption of the speed according to the environment, such as the another vehicle 2 traveling at a speed of 100 km/h on an expressway or the another vehicle 2 traveling at a speed of 15 km/h in a parking lot.

Embodiment 2

Next, an outside environment recognition device 100 according to Embodiment 2 of the present invention will be described. The repetitive description of common points with Embodiment 1 will be omitted.

In Embodiment 1, for the simplicity of the description, only the another vehicle 2 is considered as a virtual target that may come into contact with the own vehicle 1. However, various moving objects such as pedestrians, bicycles, and motorbikes exist in the actual traveling environment of the own vehicle 1. Thus, it is necessary to set the first region $A_1$ and the second region $A_2$ in consideration of virtual targets other than the another vehicle 2 in the actual traveling environment.

Therefore, in the outside environment recognition device 100 in the present embodiment, the recognition region division unit 23 performs the calculation in the arrival time calculation unit 23a on the assumption that the virtual target is a pedestrian with a movement speed of 5 km/h and a total length of 0.5 m. In addition, the recognition region division unit 23 performs the calculation in the arrival time calculation unit 23a on the assumption that the virtual target is a bicycle with a movement speed of 15 km/h and a total length of 2 m. Furthermore, the recognition region division unit 23 performs the calculation in the arrival time calculation unit 23a on the assumption that the virtual target is a motorcycle with a movement speed of 40 km/h and a total length of 2 m. As described above, the arrival time calculation unit 23a in the present embodiment performs four types of calculations on the assumption that a pedestrian, a bicycle, and a motorbike are virtual targets in addition to the another vehicle 2 described in Embodiment 1.

As a result, in Step S6 of FIG. 5, the contact determination unit 23b in the present embodiment determines the degree of the contact possibility with the another vehicle 2, a pedestrian, or the like based on the calculation result of Expression 1 regarding each of the another vehicle 2, the pedestrian, the bicycle, and the motorcycle. Then, the first region $A_1$ is set for the division region having a high contact possibility with any target, and the second region $A_2$ is set for other division regions.

Since the pedestrian, the bicycle, and the motorbike behave differently from the vehicle, setting results of the first region $A_1$ and the second region $A_2$ may be different between an environment where only the another vehicle 2 is assumed as the virtual target and an environment where virtual targets other than the another vehicle 2 such as pedestrians are assumed.

For example, in FIG. 6 on the assumption that a pedestrian or a bicycle does not exist, traveling of the another vehicle 2 from the left side of the lane on the front side as viewed from the own vehicle 1 temporarily stopped violates the traffic rules. Thus, the front division region is set as the second region $A_2$. However, on the premise that a pedestrian or a bicycle exists, there is a possibility that the pedestrian or the bicycle runs out of the front of the left blind region D, and thus the front division region is set as the first region $A_1$. In addition, in FIG. 7 on the premise that a motorcycle does not exist, the division region on the front side facing the left surface of the another vehicle 2 waiting for right turn is set as the second region $A_2$ because this region is a region where another vehicle cannot pass. However, on the premise that a motorcycle exists, there is a possibility that the motorcycle passes through the division region, and thus the division region on the front side is also set as the first region $A_1$.

As described above, according to the outside environment recognition device 100 in the present embodiment, it is possible to realize target recognition that achieves both rapidity and reliability even in an environment where a target (pedestrian, bicycle, motorcycle, and the like) other than the another vehicle 2 exists.

REFERENCE SIGNS LIST 100 outside environment recognition device
10 information acquisition device
11 outside environment information acquisition unit
12 vehicle information acquisition unit
20 arithmetic operation device
21 blind region edge detection unit
22 traveling path estimation unit
23 recognition region division unit
23a arrival time calculation unit
23b contact determination unit
24 target detection unit
24a first recognition processing unit
24b second recognition processing unit
1 own vehicle
R path
2 other vehicle
$A_1$ first region
$A_2$ second region
$e_n$ division point
$p_n$ arrival point
D blind region
E edge of blind region

The invention claimed is:

1. An outside environment recognition device comprising:
an information acquisition device that acquires outside environment information from an outside environment sensor and vehicle information from a vehicle sensor; and
an arithmetic operation device that recognizes a target based on the outside environment information and the vehicle information,
wherein the arithmetic operation device includes
a blind region edge detection unit that detects an edge of a blind region where the target is likely to appear, based on the outside environment information,
a traveling path estimation unit that estimates a future path of an own vehicle based on a traveling direction and a speed of the own vehicle included in the vehicle information,
a recognition region division unit that divides a region between the edge and the path into a first region to which first target recognition processing is applied and a second region to which second target recognition processing is applied, based on a contact possibility between the own vehicle and a virtual target appearing in the path from the edge, and
a target detection unit that detects a target appearing from the edge by applying the first target recognition processing in the first region, and detects the target appearing from the edge by applying the second target recognition processing in the second region, and
the first target recognition processing and the second target recognition processing have different recognition sensitivities.

2. The outside environment recognition device according to claim 1,
wherein the first target recognition processing is applied to a region where the contact possibility is high, and gives priority to rapidity, and
the second target recognition processing is applied to a region where the contact possibility is low, and gives the priority to reliability.

3. The outside environment recognition device according to claim 1, wherein
the first target recognition processing is processing of recognizing a target when a number of times of continuously detecting the target based on the outside environment information exceeds a first threshold value, and
the second target recognition processing is processing of recognizing a target when the number of times of continuously detecting the target based on the outside environment information exceeds a second threshold value greater than the first threshold value.

4. The outside environment recognition device according to claim 1, wherein the recognition region division unit includes
an arrival time calculation unit that generates a plurality of division points by dividing the edge by a certain width, generates an arrival point at which a virtual target appearing from each division point arrives on the path of the own vehicle, and calculates a time at which the virtual target arrives at each arrival point and a time at which the own vehicle arrives at each arrival point, and
a contact determination unit that determines the contact possibility between the virtual target and the own vehicle based on each arrival time.

5. The outside environment recognition device according to claim 4, wherein the arrival time calculation unit considers an entire width of the own vehicle and an entire length of the virtual target when calculating the time at which the virtual target arrives at the arrival point.

6. The outside environment recognition device according to claim 4, wherein
the virtual target is another vehicle, and
the arrival time calculation unit calculates a time at which the another vehicle arrives at each arrival point, by using a speed of the another vehicle set in accordance with an environment around the own vehicle.

7. The outside environment recognition device according to claim 4, wherein
the virtual target is a pedestrian, a bicycle, or a motorcycle, and
the recognition region division unit performs division into the first region and the second region in consideration of a behavior of the pedestrian, the bicycle, or the motorcycle.

8. An outside environment recognition method of recognizing a target based on outside environment information from an outside environment sensor and vehicle information from a vehicle sensor, the outside environment recognition method comprising:
a step of detecting an edge of a blind region where the target is likely to appear, based on the outside environment information;
a step of estimating a future path of an own vehicle based on a traveling direction and a speed of the own vehicle included in the vehicle information;
a step of dividing a region between the edge and the path into a first region to which first target recognition processing is applied and a second region to which second target recognition processing is applied, based on a contact possibility between the own vehicle and a virtual target appearing in the path from the edge; and
a step of detecting a target appearing from the edge by applying the first target recognition processing in the first region, and detecting the target appearing from the edge by applying the second target recognition processing in the second region,
wherein the first target recognition processing and the second target recognition processing have different recognition sensitivities.

* * * * *